United States Patent
Schaefer

(10) Patent No.: US 6,953,621 B2
(45) Date of Patent: *Oct. 11, 2005

(54) FULL-GRAINED MILLED NAPA LEATHER AND PROCESS FOR THE PRODUCTION THEREOF

(76) Inventor: Philipp Schaefer, AM Leinewehr 25, D-30519 Hannover (DE)

( * ) Notice: Subject to any disclaimer, the term of this patent is extended or adjusted under 35 U.S.C. 154(b) by 148 days.

This patent is subject to a terminal disclaimer.

(21) Appl. No.: 10/301,396

(22) Filed: Nov. 21, 2002

(65) Prior Publication Data

US 2003/0194565 A1 Oct. 16, 2003

(30) Foreign Application Priority Data

Apr. 15, 2002 (AT) ........................................ GM238/2002

(51) Int. Cl.$^7$ ............................... B32B 5/00; B05D 1/00
(52) U.S. Cl. ................ 428/305.5; 428/308.4; 428/315.7; 428/318.4; 427/262
(58) Field of Search ................ 428/423.1, 423.3, 428/423.4, 305.5, 308.4, 315.7, 318.4, 262; 264/216; 156/231

(56) References Cited

U.S. PATENT DOCUMENTS

| | | | | |
|---|---|---|---|---|
| 4,500,373 A | * | 2/1985 | Kubota | 156/79 |
| 4,863,995 A | * | 9/1989 | Murakami et al. | 525/74 |
| 4,983,245 A | * | 1/1991 | Schaefer | 156/231 |
| 6,733,877 B2 | * | 5/2004 | Schaefer | 428/327 |

* cited by examiner

*Primary Examiner*—Thao T. Tran
(74) *Attorney, Agent, or Firm*—Laurence A. Greenberg; Werner H. Stemer; Ralph E. Locher

(57) ABSTRACT

A full-grained milled napa leather is provided on its grain side with a dressing formed from a solidified plastics dispersion. Required leather properties are still ensured and the production process is substantially simplified and more economical. First, the leather, such as cowhide, is subjected on a mechanically untreated grain side to a milling process for at least two hours. This results in a typical napa structure with a natural pebbled grain. Then, a polyurethane dispersion is applied to the grain side containing pigment particles and optionally further additives. Then the hide is allowed to dry. The solidified dispersion forming the dressing has a thickness of, preferably, from 0.05 mm to 0.07 mm.

42 Claims, 1 Drawing Sheet

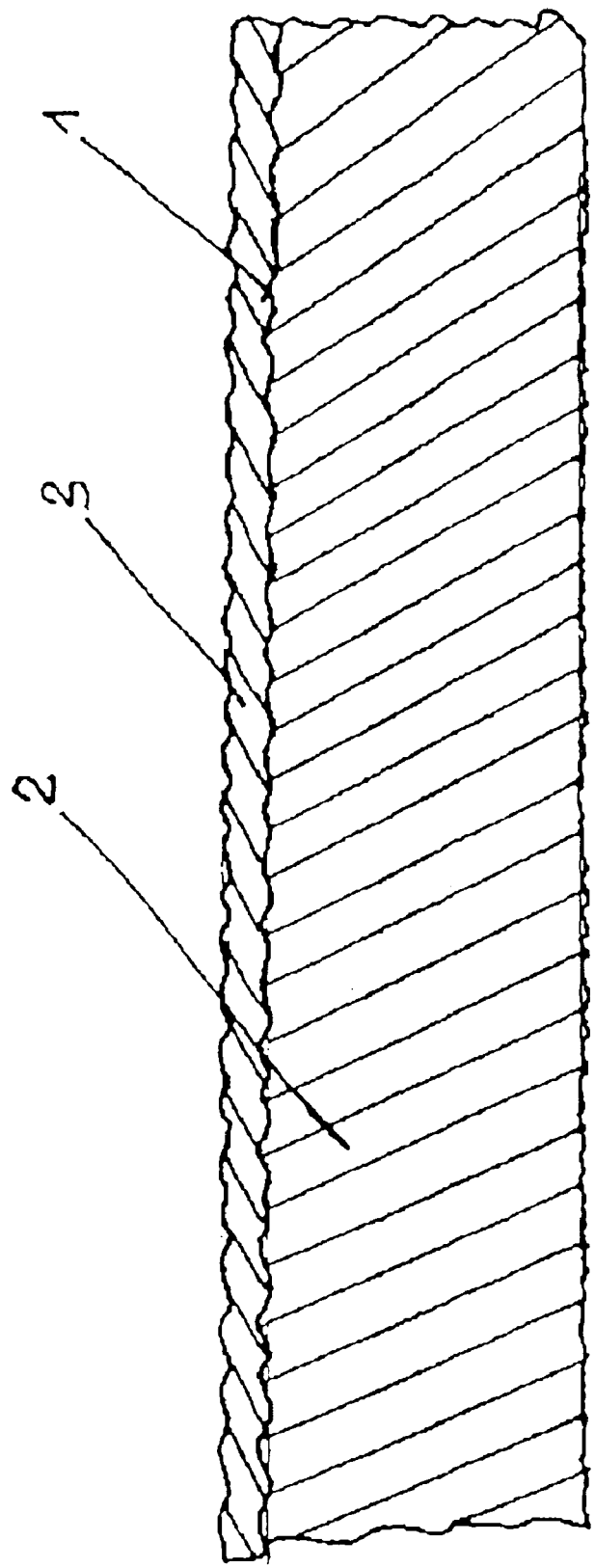

FULL-GRAINED MILLED NAPA LEATHER AND PROCESS FOR THE PRODUCTION THEREOF

BACKGROUND OF THE INVENTION

Field of the Invention

The invention relates to a full-grained milled napa leather which is provided on its grain side with a dressing formed of a solidified plastics dispersion, optionally a finish coat being applied to the dressing. Furthermore, the invention relates to a process for the production of such a milled napa leather.

The term "full-grained milled napa leather" is understood as meaning a full-grained leather which acquires its softness in combination with the formation of the napa surface structure with the characteristic "pebbled grain" by mechanical treatment, in particular by prolonged milling. The formation of the pebbled grain may be round or flat, large or small and may also be differently formed within a leather hide of a hide cut. In the area where the leather hide has a higher density and is stiffer, the pebbled grain is formed only slightly, if at all.

Of particular importance in the case of a milled napa leather is the acquisition of the natural surface structure, such as, for example, the hair pores, and the softness, in order to meet the requirements set for the leather, in particular when it is used for sports shoes, upholstery coverings and interior trims in vehicles.

It is already known that the grain side of a full-grained leather can be provided with a dressing and then drummed in order to make the leather suitable for the intended use and to impart to the leather the appearance of a milled napa leather. Preferably, the grain is not formed by embossing the dressing, but the natural structure of the upper grain layer, such as the hair pores, is visible through the dressing. These known dressed milled napa leathers meet the requirements set by the shoe industry and vehicle industry with respect to abrasion resistance, scratch resistance, lightfastness and color abrasion fastness, but the required water vapor permeability of 1.8 mg/cm$^2$.h, however, is not achieved or achieved only with very great difficulty.

In the case of the prior art leathers, the dressing consists of at least two coats, namely of a very soft polymer base coat, which is applied directly to the full-grained or buffed leather prior to drumming, and of a hard polymer outer coat, i.e. a top coat, which is applied, likewise directly, to the solidified soft polymer base coat. After the solidification of the hard polymer top coat, the leather is made soft by drumming, the pebbled grain more or less forming within different zones.

Owing to the hard top coat for which polymeric film formers which lead to films having a hardness of more than 85 Shore A are used, the leather becomes unattractive on prolonged drumming, at least in the abdominal area, owing to a loose-grained appearance. These areas often account for up to 40% of the total hide surface.

A further disadvantage of these leathers is that the industry's requirement of at least 3.5 N/cm$^2$, frequently also 4.5 N/cm$^2$, for the adhesion of the dressing to the grain side of the leather is only seldom achieved, if at all, in the case of absolutely full-grained leathers. In order to achieve a value of 4.5 N/cm$^2$, the leathers are often finely buffed on their grain surface. However, this is contrary to the concept of value of the full-grained character.

A further disadvantage of these leathers is that the hard top coat of the dressing becomes detached from the soft base coat on repeated flexing, especially on repeated flexing under wet conditions, particularly when the soft base coat is crosslinked or contains substances having a separating effect, such as waxes or oils, but especially low molecular weight silicones.

If leathers are drummed for a long time after dressing, in order to achieve the required softness, the dressing frequently has troublesome surface defects due to the drumming, in spite of the hard top coat. Moreover, the gloss of the top coat changes during drumming and hence also the color as a result of polishing. A further disadvantage is that the dust inevitably formed during drumming sticks in the pores, with the result that the gloss and the color are also influenced, especially when the uppermost finish coat imparts a softer and therefore more pleasant handle.

However, the milled napa leathers known to date, which meet the stated requirements of the sports shoe and motor vehicle industries generally do not have the required hydrolysis stability, which is particularly important for avoiding complaints. The cause of this is in general the extremely soft bottom coat of the dressing, which coat consists of a solidified plastics dispersion.

Austrian utility model AT 4967U discloses a full-grained cowhide napa leather on whose grain side there is provided a dressing formed of two coats. In the procedure adopted here, an aqueous dispersion which contains compact particles forming hollow microspheres and which is based on polyurethane and/or polyacrylate is first applied to the grain side and allowed to solidify by removal of water to form a first coat, the solidified first coat is then embossed by application of pressure and/or heat, the hollow microspheres forming from the compact particles, and a further aqueous polyurethane dispersion which forms a second lacquer coat after solidification of said polyurethane dispersion is then applied to the solidified first coat, whereupon the leather is subjected to a drumming treatment for several hours. Such coated milled napa leathers are used in the automotive industry and for the production of high-quality upholstered furniture, but also for upper leather and must have the required suppleness and possess a softness of at least 4, preferably more than 4.5, so that, on the one hand, they can be brought into the required form and, on the other hand, a pleasant touch sensation and sitting sensation are ensured. The softness is measured using a softness tester BLC ST 300 according to IUP36 at a ring diameter of 25 mm.

Furthermore, these leathers must meet the requirements set with regard to water vapor permeability, abrasion resistance, scratch resistance, repeated flexing and lightfastness.

The production of such milled napa leathers having a dressing consisting of a plurality of coats requires numerous process steps, so that the production process is complicated and expensive. Another disadvantage in the case of the known process is that, during application of each coat, dirt particles may be incorporated in the wet coating material and have an adverse effect, in particular in the case of leathers having a light surface, so that rejected products often occur here. This is also the case where leathers having a surface of different colors are to be produced on a machine line.

A further disadvantage of using the known process is that the adhesion between the unprocessed grain side of a full-grained leather and the coating is very low and the adhesive force scarcely exceeds an amount of 4.5 N/cm$^2$.

This value is never reached in the case of leathers having a smooth surface and in the case of leathers which are hydrophobic. In order to achieve higher adhesion values, as demanded in particular in the vehicle and shoe industries, it is necessary to roughen the grain side, with the result that the grain structure is falsified.

In the case of a multicoat structure of the dressing, there is furthermore the danger that the individual coats will separate from one another. Another, very substantial disadvantage is that the desired water vapor permeability of the dressed leather is reduced with each coat by the application of different coats, since the liquid coating material penetrates into the open pores of the solidified coat underneath and closes these pores.

SUMMARY OF THE INVENTION

It is according an object of the invention to provide a full-grained milled napa leather and a process for the production thereof which overcomes the above-mentioned disadvantages of the heretofore-known devices and methods of this general type and which substantially simplifies the production procedure and makes it more economical, while the required properties of the leather are nevertheless attained.

With the foregoing and other objects in view there is provided, in accordance with the invention, a full-grained milled napa leather assembly, comprising:

a leather having a grain side;

a dressing formed of a solidified plastics dispersion applied in a single coat to said grain side of said leather after said leather has been softened by mechanical treatment.

In other words, the objects are achieving in that the invention proposes starting from a full-grained milled napa leather of the type described at the outset and forming the dressing from a single coat applied to the grain side of the leather mechanically softened, in particular drummed, for application of the dressing. What is therefore important in the case of the milled napa leather assembly according to the invention is that the leather is first softened by mechanical treatment, in particular by drumming or milling, but also by one or more staking operations, with the result that said leather acquires its required softness, the grain side also forming a good adhesion surface for the dressing through this treatment. Because only a single coat is arranged on this grain side after the mechanical treatment, in particular by drumming, the required water vapor permeability is also ensured. In any case, the production process is also simpler and more economical as a result of the reduction of the operations.

Very good mechanical properties of the milled napa leather assembly according to the invention are obtained when the plastics dispersion forming the dressing has a solids content of from 30 to 55% by volume, preferably from 35 to 40% by volume. By using such a plastics dispersion, small defects on the grain side can also be corrected.

The plastics dispersion expediently at least partly comprises a polyurethane dispersion which, after drying and crosslinking, forms a film having moderate softness. The polyurethane dispersion preferably consists of an aliphatic polyester and may also contain polyacrylate.

The plastics dispersion preferably also contains a high molecular weight, film-forming polysiloxane dispersion or emulsion in an amount of from 3.5% by volume to 6% by volume. The dressing prepared from such a plastics dispersion forms a soft to moderately hard film after removal of water and evaporation of solvent, the highest mechanical strength being achieved after it is crosslinked. These mechanical strength properties are also retained completely or virtually completely after aging by hydrolysis.

According to a further feature of the invention, the plastics dispersion forming the dressing may contain hollow microspheres having a diameter of less than 45 $\mu$m, whose thin shell at least partly comprises polyvinylidene chloride copolymer and which contain a gas, for example isobutane, in the interior. These hollow microspheres, which are included in the solids content, and optionally further plastics particles mixed with the plastics dispersion and having a size of less than 0.35 $\mu$m, in particular comprising polypropylene, polyethylene, polyamide or the like, improve the handle and the glidability of the surface of the dressing and also its mechanical strength.

The dressing of the milled napa leather assembly according to the invention expediently has a thickness of from 0.02 mm to 0.07 mm, preferably from 0.05 mm to 0.07 mm, and preferably a density of from 0.9 g/cm$^3$ to 1 g/cm$^3$.

It has proven expedient if the plastics dispersion contains a finely pulverulent wood meal in an amount of from 0.5 to 9% by volume, preferably in an amount of from 1.5 to 7% by volume. As a result, the water vapor permeability of the dressing can be improved or can be changed by varying the amount added and can be adapted to the respective requirements. Furthermore, the added wood meal acts like a dulling agent and the leather acquires a pleasant handle.

It is particularly advantageous if the leather is cut to size before application of the plastics dispersion, i.e. if smaller parts corresponding to the use of the leather are cut out of a large leather hide before application of the plastics dispersion. A whole cattle leather hide having a size of about 5.5 m$^2$ has different densities and fiber structures in the various regions, which can be taken into account when producing the size cuts. Thus, the size cuts produced from the hide center having a higher density can, when provided with a suitable dressing, be used for steering wheel coverings, and the size cuts produced from the flanks of the hide which have a loose fiber structure can be employed for upholstery coverings. In this way, the entire hide can be optimally utilized without substantial waste.

If desired, a thin finish coat, which however does not form part of the dressing, can also be applied to the dressing in the case of the milled napa leather assembly according to the invention.

With the above and other objects in view there is also provided, in accordance with the invention, a method of producing a full-grained milled napa leather. The novel method comprises the following steps:

providing a leather with a grain side (e.g., cowhide);

subjecting the leather to a mechanical treatment for softening the leather (e.g., milling, fulling), and forming a pebbled-grain napa structure;

subsequently applying an aqueous plastics dispersion to the grain side and allowing the plastics dispersion to dry, to form a coating with a thickness from 0.02 mm to 0.07 mm, and preferably from 0.05 to 0.07 mm.

In other words, the process for the production of the full-grained milled napa leather includes providing the leather with a dressing which consists of a solidified plastics dispersion. The leather, in particular cowhide leather, is subjected to mechanical treatment, preferably a milling treatment, for softening, a pebbled-grain napa structure being formed, whereupon an aqueous plastics dispersion is applied to the grain side in an amount, and allowed to dry, preferably under the action of heat, such that a coating having a thickness of from 0.02 mm to 0.07 mm, preferably from 0.05 mm to 0.07 mm, is formed. An aqueous plastics dispersion having a solids content of from 30% by volume to 55% by volume, preferably from 35% by volume to 40% by volume, is preferably used here.

In addition to pigments, this aqueous plastics dispersion may preferably also contain hollow microspheres whose thin shell at least partly comprises polyvinylidene chloride copolymer and which contain a gas, for example isobutane, in the interior.

An aqueous plastics dispersion which also contains a high molecular weight, film-forming polysiloxane dispersion or emulsion in an amount of from 3.5% by volume to 6% by volume is preferably used if the polysiloxane dispersion or emulsion has a solids content of from 40% to 60%.

Improvement or control of the water vapor permeability can furthermore be effected by mixing finely pulverulent wood meal in an amount of from 0.5 to 9% by volume, preferably in an amount of from 1.5 to 7% by volume, with the plastics dispersion before application. By varying the amount, the water vapor permeability can be adapted to the respective requirements. Thus, the disadvantageous perforation of the dressed leather in the seat area of an automobile seat can be avoided by admixing wood meal in an appropriate amount. Moreover, the wood meal acts as a dulling agent and results in a pleasant handle.

Since the aqueous plastics dispersion contains both light and heavy particles, it must be stirred before it is used, in order to prevent settling or floating of these particles. In order to remove the air which is stirred in and leads to troublesome frothing, deforming is expediently effected, prior to application, by applying reduced pressure or by admixing an antifoam.

The application of the plastics dispersion can be effected in one operation by means of a coating roll, preferably by means of a coating roll rotating in the opposite direction to a linear movement of the leather, by spraying on wet-on-wet by means of a spray gun or by casting by means of a casting apparatus.

Spraying on is expediently effected in the case of whole leather hides. If, on the other hand, the plastics dispersion is applied by means of a coating roll or by casting onto the grain side of the leather, it is advantageous according to the invention to cut parts or size cuts out of a whole leather hide and to provide them with a dressing. In this case, the dressing can be economically applied on small lines.

It may furthermore be advantageous to provide the back of the leather with an elastomeric foam coating prior to application of the dressing, in order to achieve a cushioning effect. This is expedient particularly when the plastics dispersion is applied by casting onto the grain side of the leather which is present on an acceleration belt of a casting apparatus, since this foam coating improves the adhesion between the leather and the acceleration belt.

According to the invention, the applied aqueous plastics dispersion is dried at a temperature of from 70° C. to 90° C., preferably 80° C. After drying, the leather can also be stored at an elevated temperature of 50° C. for about 12 hours. After this storage at elevated temperature, the crosslinking of the dressing is complete, and the adhesive force between the dressing and the grain side of the leather is more than 4.5 N/cm$^2$ everywhere.

If the softness of the leather decreases substantially as a result of the dressing, it may be advantageous if, according to the invention, the leather is subjected to an aftertreatment by additional drumming after formation of the dressing consisting of a solidified plastics dispersion.

Particularly when the leather is exposed to high stresses, such as, for example, in the case of seats of public means of transport, it is advantageous if the grain side of the leather is subjected to a pretreatment prior to application of the plastics dispersion, i.e. for example by buffing by means of a fine abrasive paper, so that at least 90% of the grain structure of the surface of the leather is retained. By means of such light buffing with an extremely fine abrasive paper, the adhesive power is substantially increased.

For this purpose, however, it is also possible to flame-treat the grain side of the leather before application of the dressing. It has been found that radicals form in the surface of the leather as a result of this flame treatment, simultaneously substantially improving the adhesion of the dressing. A flame similar to a soldering flame, by which the grain layer is heated only superficially to more than 160° C., is most suitable for this purpose, the temperature not exceeding 110° C. in the middle and on the underside of the leather. This treatment of the leather does not change the appearance of the grain side.

Expediently, parts are cut to size from a leather hide before application of the dispersion forming the dressing. As a result of this, it is not only possible, as already mentioned, to take into account different characteristics of the hide in the individual areas thereof and thus ensure utilization of the entire hide, but it is also possible to change the composition and characteristic of the dressing in a simple manner to meet the requirements. Thus, for example, the individual parts cut to size can be such that a part of the dressing is softer and another part is harder or has a higher density and therefore possesses better abrasion properties, or that parts of the dressing have a different appearance, for example a different hue.

This can be achieved in a simple manner by controlling the application of the dispersion forming the dressing by means of a data medium, for example by means of a CD-ROM, a floppy disk or a memory chip. A further advantage of using such parts cut to size is that cheaper spray systems and finer spray nozzles can be used for applying the plastics dispersion, so that less overspraying is required and a smaller amount of waste results.

Other features which are considered as characteristic for the invention are set forth in the appended claims.

Although the invention is illustrated and described herein as embodied in a full-grained milled napa leather and process for the production thereof, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The drawing shows a section through the leather according to the invention, on a greatly enlarged scale.

DESCRIPTION OF THE PREFERRED EMBODIMENTS

Referring now to the sole FIGURE of the drawing in detail, there is shown the natural grain 1 of a full-grained untreated cowhide leather 2. The leather is provided, after a milling process lasting several hours, with a dressing 3 which is formed from a solidified plastics dispersion and has a thickness of from 0.02 mm to 0.07 mm, preferably from 0.05 mm to 0.07 mm. The plastics dispersion forming the dressing 3 predominantly comprises a pigment-containing polyurethane dispersion, to which high molecular weight polysiloxane in the form of a dispersion, emulsion and expediently hollow microspheres having a polyvinylidene chloride copolymer shell, an antifoam and a dulling agent have been added.

EXAMPLE 1

A chrome-tanned hard black cattle leather hide (crust) dried on a vacuum dryer and having a full-grained, even and smooth grain side and a thickness of about 1.2 mm was drummed for 6 hours. As a result, the leather became very soft and also had a softness of more than 5.5, measured in a softness tester BLC ST300 according to IUP36 at a ring diameter of 25 mm, in the harder zones. The full-grained, unpretreated grain side of the leather showed slight areas of damage on its surface. The small indentations attributable to cracks on the back or the like were rough and better visible after drumming, as were the hair pores.

The drumming resulted not only in the formation of the pebbled grain but also in the characteristic surface structure of the leather being visible again, and the previously smooth surface had a microscopic roughness. The grain side was "opened" after the drumming.

The dispersion used for the dressing has the following composition and a solids content of about 43% by volume:
  800 g of 40% strength polyurethane dispersion
  60 g of black pigment dispersion
  40 g of 80% strength crosslinking agent
  60 g of high molecular weight polysiloxane as a 50% strength dispersion
  30 g of isopropanol
  3 g of antifoam
  6 g of dry hollow microspheres comprising polyvinylidene chloride copolymer having a size of less than 30 μm
  1 g of inorganic dulling agent, dry After mixing, the dispersion was deaerated by means of reduced pressure until it was homogeneous and free of air bubbles. The mixture had a density of 0.91 g/cm$^3$ and a viscosity of 14 seconds, measured in a Ford cup using a nozzle of 4 mm diameter.

This mixture was then applied to the grain side of the leather moving on a conveyor belt, by means of a coating roll which rotated in the opposite direction to the movement of the leather, application being effected under a very slight pressure. The amount of about 110 cm$^3$/m$^2$ was applied to the leather. This was followed by drying of the aqueous dispersion in a heating tunnel at a temperature of about 80° C. and at a residence time of about 3 minutes. After drying, the dressing had a thickness of 0.05 mm.

The pebbled-grain napa structure of the leather, present before application of the dressing, was completely retained after the application, and the typical surface structure of the full-grained leather with clearly visible hair pores was virtually completely retained. After storage at an elevated temperature of about 50° C. for 12 hours, the crosslinking of the dressing was complete and the dressing had an adhesion of more than 6 N/cm$^2$ according to DIN 53357.

The carefully cleaned, detached dressing had a density of about 0.92 g/cm$^3$ and floated on water containing a wetting agent. The water vapor permeability was 1.9 mg/cm$^2$.h. The abrasion resistance according to DIN 53109 (Taber) with a load of 500 g was satisfactory after 750 cycles. The bending endurance according to DIN 53351 was satisfactory after 100 000 flexes, and the dressing withstood a further 100 000 flexes after hydrolytic aging for 7 days at +70° C. and 95% relative humidity.

The softness of the dressed leather, measured using the softness tester BLC ST 300 according to IUP 36, was from 4.5 to 5.5 at all measuring points. Accordingly, the leather met the requirements both for sports shoes and for vehicle interior trims.

A parallel experiment with an undrummed leather which was dried under reduced pressure, dressed under the same conditions and only then drummed gave an adhesion, according to DIN 53357, of only 3.7 N/cm$^2$.

EXAMPLE 2

A full-grained, natural colored leather which was dried on a toggle frame and had a thickness of 1.6 mm showed a softness of more than 4.5 at all measuring points after drumming for 8 hours. The dispersion used for the dressing had a similar composition to that of example 1. However, a white pigment dispersion in an amount of 120 g and, instead of 1 g of inorganic dulling agent, 2 g of polypropylene powder were used. Instead of 800 g of polyurethane dispersion, 700 g of polyurethane dispersion and 100 g of a hard polyacrylate dispersion were used. The dispersion was applied, as described in example 1, in an amount of 140 cm$^3$/m$^2$ to the leather and, on application, was likewise homogeneous and free of stirred-in air. It had a density of 1.2 g/cm$^3$, owing to the use of a white pigment having a high specific gravity. The viscosity was 17 seconds. After drying and storage, the following values were obtained on testing:
  Softness: from 4.0 to 5.0
  Water vapor permeability and air permeability: 1.5 mg/cm$^2$.h
  Density of the dressing: about 1 g/cm$^3$
  Bending endurance: 100 000 flexes, also after hydrolytic aging (satisfactory)
  Abrasion resistance (Taber): 600 cycles (satisfactory)

EXAMPLE 3

A chrome-tanned cattle leather hide (crust) as described in example 1 and prepared for the application of a dispersion forming the dressing showed the features described in example 1.

The dispersion used for the dressing had the following composition:
  750 g of polyester-polyurethane dispersion having a solids content of about 40% by volume
  80 g of black pigment dispersion
  35 g of 80% strength crosslinking agent
  50 g of high molecular weight polysiloxane as a 60% strength emulsion
  20 g of isopropanol
  15 g of moist hollow microspheres having a polyvinylidene chloride copolymer shell
  1 g of antifoam
  25 g of finely pulverulent wood meal as a dulling agent and for increasing the water vapor permeability.

After mixing, the batch had a density of 0.89 g/cm$^3$ and a viscosity of 45 seconds, measured in a Ford cup using a nozzle of 4 mm diameter.

The application of the batch of the mixture to the leather was effected as described in example 1, as was the drying. After intermediate storage at room temperature for 24 hours, the dressed leather was again drummed for 5 hours in a milling drum. The leather was then very soft and had a softness of more than 5.5 at all measuring points. The thickness of the dressing was 0.035 mm. The water vapor permeability was 2.7 mg/cm$^2$.h and was thus surprisingly extremely high.

Owing to this high water vapor permeability, the disadvantageous perforation of the dressed leather in the seat region of an automobile seat can be avoided.

Since the grain side of the drummed natural leather ensures good adhesion of the dressing because of its "opening" by the drumming, no processing of the grain side is required before application of the dressing. In the case of leathers which are exposed to extremely high stresses, such as, for example, in the case of leathers which are used for seats in public means of transport, it is however advantageous if the grain side is slightly roughened by means of a fine abrasive paper or flame-treated prior to application of the dressing, with the result that the adhesion between the grain side and the dressing increases.

If required, a thin finish coat which is not included in the dressing and which always adversely affects the water vapor permeability may furthermore be applied to the dressing.

If desired, an elastomeric foam coating containing, for example, hollow microspheres can be provided on the back of the leather. This foam coating also improves the adhesion of the leather to the acceleration belt of a casting apparatus when casting or spraying the plastics dispersion onto the grain side.

The present invention makes it possible in future to provide milled napa leather with a colored dressing in the desired colors directly in the leather-processing industry, especially because the casting of the dressing onto the grain side of the leather can be effected economically on small casting, spraying and roll-coating apparatuses with the use of relatively small pieces cut out of a leather hide or with the use of size cuts.

Instead of drumming, the leather hide can also be pretreated by other mechanical methods by means of which the leather is softened and/or the pores are opened on the grain side, such as, for example, by thorough staking, before application of the coat forming the dressing. In this case, however, the leather generally has to be drummed after dressing in order to form the pebbled grain. With an appropriate measurable thickness of more than 2 mm, the soft to moderately hard dressing has a hardness of from 38 to 68 Shore A. By additional drumming after dressing, the water vapor permeability is also improved by from 10 to 29% in comparison with leather which was drummed prior to dressing. According to the invention, the high water vapor permeability comes about primarily because the micropores are continuous from top to bottom in the single-layer dressing, i.e. they do not overlap; they are similar to pores, which have been created mechanically by needling.

I claim:

1. A full-grained milled napa leather assembly, comprising:
    a leather having a grain side;
    a dressing formed of a solidified plastics dispersion applied in a single coat to said grain side of said leather after said leather has been softened by mechanical treatment, the plastics dispersion at least partly including a polyurethane dispersion, the polyurethane dispersion containing aliphatic polyester and an optional component of polyacrylate, the plastics dispersion containing hollow microspheres having a diameter of less than 45 μm, having a thin shell at least partly including polyvinylidene chloride copolymer, and containing a gas, said dressing having a thickness from 0.02 mm to 0.07 mm.

2. The milled napa leather assembly according to claim 1, wherein said leather is a milled leather prior to application of said dressing.

3. The milled napa leather assembly according to claim 1, which comprises a finish coat formed on said dressing.

4. The milled napa leather assembly according to claim 1, wherein the plastics dispersion has a solids content between 30% by volume and 55% by volume.

5. The milled napa leather assembly according to claim 1, wherein the plastics dispersion has a solids content between 35% by volume and 40% by volume.

6. The milled napa leather assembly according to claim 1, wherein the plastics dispersion contains pigment particles.

7. The milled napa leather assembly according to claim 1, wherein the plastics dispersion contains a high molecular weight, film-forming polysiloxane dispersion or emulsion in an amount of from 3.5% by volume to 6% by volume, and wherein a solids content of the dispersion or emulsion ranges from 40% to 60%.

8. The milled napa leather assembly according to claim 1, wherein the gas in an interior of said microspheres is isobutane.

9. The milled napa leather assembly according to claim 1, wherein the plastics dispersion contains plastics particles admixed thereto, and the plastics particles are formed of a polymer selected from the group consisting of polypropylene, polyethylene, and polyamide.

10. The milled napa leather assembly according to claim 1, wherein the dressing has a thickness from 0.05 mm to 0.07 mm.

11. The milled napa leather assembly according to claim 1, wherein the dressing has a density of from 0.9 g/cm$^3$ to 1 g/cm$^3$.

12. The milled napa leather assembly according to claim 1, wherein the plastics dispersion contains a finely pulverulent wood meal in an amount of from 0.5 to 9% by volume.

13. The milled napa leather assembly according to claim 1, wherein the plastics dispersion contains a finely pulverulent wood meal in an amount of from 1.5 to 7% by volume.

14. The milled napa leather assembly according to claim 1, wherein said leather is cut to size and shape prior to application of the plastics dispersion.

15. A method of producing a full-grained milled napa leather, which comprises:
    providing a leather with a grain side;
    subjecting the leather to a mechanical treatment for softening the leather, and forming a pebbled-grain napa structure;
    subsequently applying an aqueous plastics dispersion to the grain side and allowing the plastics dispersion to dry, to form a single coating with a thickness from 0.02 mm to 0.07 mm, the plastics dispersion at least partly including a polyurethane dispersion, the polyurethane dispersion containing aliphatic polyester and an optional component of polyacrylate, the plastics dispersion containing hollow microspheres having a diameter of less than 45 μm, having a thin shell at least partly including polyvinylidene chloride copolymer, and containing a gas.

16. The method according to claim 15, which comprises forming a coating with a thickness from 0.05 mm to 0.07 mm.

17. The method according to claim 15, wherein the providing step comprises providing a cowhide leather and the mechanical treatment step comprises milling the cowhide leather.

18. The method according to claim 15, wherein the aqueous plastics dispersion has a solids content from 30% by volume to 55% by volume.

19. The method according to claim 15, wherein the aqueous plastics dispersion has a solids content from 35% by volume to 40% by volume.

20. The method according to claim 15, wherein the aqueous plastics dispersion contains pigment particles.

21. The method according to claim 15, wherein the aqueous plastics dispersion contains a high molecular weight, film-forming polysiloxane dispersion or emulsion in an amount of more than 3.5% by volume.

22. The method according to claim 15, wherein the aqueous plastics dispersion contains a high molecular weight, film-forming polysiloxane dispersion or emulsion in an amount of more than 6% by volume.

23. The method according to claim 15, which comprises, prior to the applying step, mixing finely pulverulent wood meal in the plastics dispersion in an amount of from 0.5 to 9% by volume.

24. The method according to claim 23, wherein the wood meal is admixed in an amount of from 1.5 to 7% by volume.

25. The method according to claim 15, which comprises, prior to the applying step, defoaming the aqueous plastics dispersion.

26. The method according to claim 25, wherein the defoaming step is a process selected from the group consisting of subjecting the dispersion to a vacuum and admixing an antifoam.

27. The method according to claim 15, which comprises rolling the aqueous plastics dispersion on the grain side of the leather with a coating roll.

28. The method according to claim 27, which comprises rotating the coating roll in a counter-rotation to a direction of linear movement of the leather.

29. The method according to claim 15, which comprises spraying the aqueous plastics dispersion onto the grain side of the leather.

30. The method according to claim 15, which comprises spraying the aqueous plastics dispersion onto the grain side of the leather with a spray gun in a plurality of operations wet on wet.

31. The method according to claim 15, which comprises casting the aqueous plastics dispersion onto the grain side of the leather with a casting apparatus.

32. The method according to claim 15, which comprises, prior to the step of applying the dressing, forming an elastomeric foam coating on a back side of the leather opposite the grain side.

33. The method according to claim 15, which comprises drying at a temperature of between 70° C. and 90° C.

34. The method according to claim 15, which comprises drying at a temperature of substantially 80° C.

35. The method according to claim 15, which comprises, subsequent to drying, storing the leather at an elevated temperature of about 50° C. for substantially twelve hours.

36. The method according to claim 15, which comprises solidifying the plastics dispersion, and subsequently subjecting the leather to an after-treatment with additional milling.

37. The method according to claim 9, which comprises subjecting the grain side of the leather to a pretreatment before applying the plastics dispersion.

38. The method according to claim 37, which comprises roughening the grain side of the leather.

39. The method according to claim 37, which comprises buffing the grain side of the leather.

40. The method according to claim 37, which comprises flame-treating the grain side of the leather.

41. The method according to claim 15, which comprises cutting parts to size from a leather hide prior to applying the plastics dispersion.

42. The method according to claim 15, which comprises applying the dispersion forming the coating under control by a data medium.

* * * * *